United States Patent
Sakai

(10) Patent No.: US 10,910,181 B2
(45) Date of Patent: Feb. 2, 2021

(54) PROJECTILE ASSEMBLY AND ELECTRIC CIRCUIT BREAKER DEVICE

(71) Applicant: DAICEL CORPORATION, Osaka (JP)

(72) Inventor: Toshiyuki Sakai, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/638,874

(22) PCT Filed: Aug. 13, 2018

(86) PCT No.: PCT/JP2018/030181
§ 371 (c)(1),
(2) Date: Feb. 13, 2020

(87) PCT Pub. No.: WO2019/035440
PCT Pub. Date: Feb. 21, 2019

(65) Prior Publication Data
US 2020/0194203 A1    Jun. 18, 2020

(30) Foreign Application Priority Data
Aug. 18, 2017 (JP) ................... 2017-157846

(51) Int. Cl.
*H01H 39/00* (2006.01)

(52) U.S. Cl.
CPC ..... *H01H 39/006* (2013.01); *H01H 2039/008* (2013.01); *H01H 2229/044* (2013.01)

(58) Field of Classification Search
CPC ............... H01H 39/00; H01H 39/006; H01H 2039/008; H01H 2229/044
See application file for complete search history.

(56) References Cited

U.S. PATENT DOCUMENTS

| 4,224,487 A * | 9/1980 | Simonsen ............ H01H 39/006 200/61.08 |
| 6,222,439 B1 | 4/2001 | Tanigawa et al. |
| 6,556,119 B1 * | 4/2003 | Lell ...................... H01H 37/323 337/157 |
| 2005/0083164 A1 | 4/2005 | Caruso et al. |
| 2005/0083165 A1 | 4/2005 | Tirmizi |
| 2005/0115390 A1 * | 6/2005 | Brede .................. H01H 39/006 89/1.14 |
| 2012/0234162 A1 | 9/2012 | Tirmizi |

(Continued)

FOREIGN PATENT DOCUMENTS

| JP | 11-232979 A | 8/1999 |
| JP | 2014-49300 A | 3/2014 |

*Primary Examiner* — Jacob R Crum
(74) *Attorney, Agent, or Firm* — Birch, Stewart, Kolasch & Birch, LLP

(57) ABSTRACT

An electric circuit breaker device with a reduced size. A first through hole 22a of a cut portion 20 and a first attachment hole 43 of a first connection portion 40 are placed on a first fixing pin 35 of a projectile 30, and a second through hole 23a of the cut portion 20 and a second attachment hole 48 of a second connection portion 45 are placed on a second fixing pin 36. By deforming an end portion of the first fixing pin 35 and an end portion of the second fixing pin 36, the projectile 30, the cut portion 20, the first connection portion 40, and the second connection portion 45 can be integrally formed together.

6 Claims, 5 Drawing Sheets

(56) References Cited

U.S. PATENT DOCUMENTS

| | | | |
|---|---|---|---|
| 2013/0220095 A1* | 8/2013 | Ukon | H01H 39/006 83/639.1 |
| 2013/0263714 A1* | 10/2013 | Ukon | B23D 15/145 83/639.1 |
| 2014/0061161 A1 | 3/2014 | Nakamura et al. | |
| 2017/0221662 A1* | 8/2017 | Sakai | H01H 39/006 |

* cited by examiner

PROJECTILE ASSEMBLY AND ELECTRIC CIRCUIT BREAKER DEVICE

TECHNICAL FIELD

The present invention relates to an electric circuit breaker device that can be used in an electric circuit of a vehicle, an electric home appliance, and the like, and a method of manufacturing a component used therein.

BACKGROUND ART

An electric circuit breaker device that breaks an electric circuit is used to prevent significant damage when an abnormality occurs in an electric circuit or a system including the electric circuit of a vehicle, an electric home appliance, or the like. Electric circuit breaker devices for electric circuits of electric vehicles are becoming increasingly important.

A known electric circuit breaker device includes, in a housing, an igniter, a projectile (piston), a conductor, and the like (US 2005/0083164 A, US 2005/0083165 A, US 2012/0234162 A, JP H11-232979 A, JP 2014-49300 A).

In US 2005/0083164 A, US 2005/0083165 A, metal, ceramic, and polymer are cited as examples of the material of a housing, and it is stated that a specific polymer is preferred (US 2005/0083164 A pages 2 to 3, US 2005/0083165 A page 2).

In JP H11-232979 A, a casing 13 is made of stainless steel (paragraph number 0011).

In JP 2014-49300 A, a case 30 has electric insulation properties, and is formed of a high-strength material (e.g., resin material) (paragraph number 0034).

SUMMARY OF INVENTION

An electric circuit breaker device according to an embodiment (a first embodiment) of the present invention comprises:

in a housing made of synthetic resin comprising a cylindrical space open at both ends, an igniter, a resin projectile, and a conductor portion that forms a portion of an electric circuit disposed in this order from a first end portion side of the cylindrical space of the housing toward an axially opposite second end portion side of the housing; and a bottom clip made of synthetic resin comprising a recess portion that forms an insulation space disposed on a side of the conductor portion opposite to where the igniter and the projectile are disposed, the insulation space being formed by the recess portion of the bottom clip closing off the housing; wherein the resin projectile comprises an end portion with a quadrangular shape, a first side surface portion and a second side surface portion connected to opposing edges of an end surface of the end portion, and a first fixing pin jutting out from the first side surface portion and a second fixing pin jutting out from the second side surface portion;

the first fixing pin comprises a first cylinder portion located on a side of the first fixing pin closer to the first side surface portion and a first end increased diameter portion located on a side of the first fixing pin closer to an end, an outer diameter of the first cylinder portion being less than an external diameter of the first end increased diameter portion;

the second fixing pin comprises a second cylinder portion located on a side of the second fixing pin closer to the second side surface portion and a second end increased diameter portion located on a side of the second fixing pin closer to an end, an outer diameter of the second cylinder portion being less than an external diameter of the second end increased diameter portion;

the conductor portion is a plate portion comprising a first connection portion and a second connection portion on opposite sides and a cut portion as an intermediate portion;

the cut portion comprises a flat surface portion with a quadrangular shape, and a first cut portion side surface portion and a second cut portion side surface portion extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

the first connection portion comprises a first flat portion with a rectangular shape in a plan view and a first connection terminal extending down from one of opposing short side edges of the first flat portion, the first connection terminal comprising a first attachment hole formed through the first connection terminal in a thickness direction;

the second connection portion comprises a second flat portion with a rectangular shape in a plan view and a second connection terminal extending down from one of opposing short side edges of the second flat portion, the second connection terminal comprising a second attachment hole formed through the second connection terminal in a thickness direction;

the projectile, the cut portion, the first connection portion, and the second connection portion are integrally formed as a cut composite;

in the cut composite, the flat surface portion of the cut portion is in contact with the end surface of the projectile, the first through hole of the first cut portion side surface portion of the cut portion is placed on the first cylinder portion of the first fixing pin formed on the first side surface portion of the projectile, the first attachment hole of the first connection terminal is also placed on the first cylinder portion, a first surface side of the first connection terminal is in contact with the first cut portion side surface portion, and a second surface side of the first connection terminal is in contact with an inner surface of the first end increased diameter portion, the second through hole of the second cut portion side surface portion of the cut portion is placed on the second cylinder portion of the second fixing pin formed on the second side surface portion of the projectile, the second attachment hole of the second connection terminal is also placed on the second cylinder portion, a first surface side of the second connection terminal is in contact with the second cut portion side surface portion, and a second surface side of the second connection terminal is in contact with an inner surface of the second end increased diameter portion; and the cut portion is orientated orthogonal to the housing and disposed facing the insulation space.

Another embodiment of the present invention relates to a method of manufacturing this electric circuit breaker device.

An electric circuit breaker device according to an embodiment (a second embodiment) of the present invention comprises:

in a housing made of synthetic resin comprising a cylindrical space open at both ends, an igniter, a resin projectile, and a conductor portion that forms a portion of an electric circuit disposed in this order from a first end portion side of the cylindrical space of the housing toward an axially opposite second end portion side of the housing;

a bottom clip made of synthetic resin comprising a recess portion that forms an insulation space disposed on a side of the conductor portion opposite to where the igniter and the projectile are disposed, the insulation space being formed by the recess portion of the bottom clip closing off the housing; wherein the resin projectile comprises an end portion with a quadrangular shape, a first side surface portion and a second side surface portion connected to opposing edges of an end surface of the end portion, and a first fixing pin jutting out from the first side surface portion and a second fixing pin jutting out from the second side surface portion;

the conductor portion is a plate portion comprising a first connection portion and a second connection portion on opposite sides and a cut portion as an intermediate portion;

the cut portion comprises a flat surface portion with a quadrangular shape, and a first cut portion side surface portion and a second cut portion side surface portion extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

the first connection portion comprises a first flat portion with a rectangular shape in a plan view and a first connection terminal extending down from one of opposing short side edges of the first flat portion, the first connection terminal comprising a first attachment hole formed through the first connection terminal in a thickness direction;

the second connection portion comprises a second flat portion with a rectangular shape in a plan view and a second connection terminal extending down from one of opposing short side edges of the second flat portion, the second connection terminal comprising a second attachment hole formed through the second connection terminal in a thickness direction;

the projectile, the cut portion, the first connection portion, the second connection portion, and the bottom clip are integrally formed as a second composite;

in the second composite, the flat surface portion of the cut portion is in contact with the end surface of the projectile, the first through hole of the first cut portion side surface portion of the cut portion is placed on the first fixing pin formed on the first side surface portion of the projectile, the first attachment hole of the first connection terminal is also placed on the first fixing pin, and a first surface side of the first connection terminal is in contact with the first cut portion side surface portion, the second through hole of the second cut portion side surface portion of the cut portion is placed on the second fixing pin formed on the second side surface portion of the projectile, the second attachment hole of the second connection terminal is also placed on the second fixing pin, a second surface side of the second connection terminal is in contact with the second cut portion side surface portion, and an end portion of the first fixing pin on an opposite side from where the projectile is located and an end portion of the second fixing pin on an opposite side from where the projectile is located are integrally formed with an inner wall surface of the recess portion of the bottom clip; and the cut portion is orientated orthogonal to the housing and disposed facing the insulation space.

Another embodiment of the present invention relates to a method of manufacturing this electric circuit breaker device.

An electric circuit breaker device according to an embodiment (a third embodiment) of the present invention comprises:

in a housing made of synthetic resin comprising a cylindrical space open at both ends, an igniter, a resin projectile, and a conductor portion that forms a portion of an electric circuit disposed in this order from a first end portion side of the cylindrical space of the housing toward an axially opposite second end portion side of the housing; and a bottom clip made of synthetic resin comprising a recess portion that forms an insulation space disposed on a side of the conductor portion opposite to where the igniter and the projectile are disposed, the insulation space being formed by the recess portion of the bottom clip closing off the housing; wherein the resin projectile comprises an end portion with a quadrangular shape, a first side surface portion and a second side surface portion connected to opposing edges of an end surface of the end portion, and a first fixing pin jutting out from the first side surface portion and a second fixing pin jutting out from the second side surface portion;

the conductor portion is a plate portion comprising a first connection portion and a second connection portion on opposite sides and a cut portion as an intermediate portion;

the cut portion comprises a flat surface portion with a quadrangular shape, and a first cut portion side surface portion and a second cut portion side surface portion extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

the first connection portion comprises a first flat portion with a rectangular shape in a plan view and a first connection terminal extending down from one of opposing short side edges of the first flat portion, the first connection terminal comprising a first attachment hole formed through the first connection terminal in a thickness direction;

the second connection portion comprises a second flat portion with a rectangular shape in a plan view and a second connection terminal extending down from one of opposing short side edges of the second flat portion, the second connection terminal comprising a second attachment hole formed through the second connection terminal in a thickness direction;

the projectile, the cut portion, the first connection portion, and the second connection portion are integrally formed as a third composite;

in the third composite, the flat surface portion of the cut portion is in contact with the end surface of the projectile, the first through hole of the first cut portion side surface portion of the cut portion is placed on the first fixing pin formed on the first side surface portion of the projectile, the first attachment hole of the first connection terminal is also placed on the first fixing pin, and a first surface side of the first connection terminal is in contact with the first cut portion side surface portion, the second through hole of the second cut portion side surface portion of the cut portion is placed on the second fixing pin formed on a second side surface portion of the projectile, the second attachment hole of the second connection terminal is also placed on the second fixing pin, a second surface side of the second connection terminal is in contact with the second cut portion side surface portion, and an end portion of the first fixing pin on an opposite side from where the projectile is located and an end portion of the second fixing pin on an opposite side from where the projectile is located are integrally formed with an inner wall surface of the cylindrical space of the housing; and the cut portion is orientated orthogonal to the housing and disposed facing the insulation space.

Another embodiment of the present invention relates to a method of manufacturing this electric circuit breaker device.

A method according to an embodiment of the present invention of manufacturing the cut composite of the electric circuit breaker device of the first embodiment comprising the projectile, the cut portion, the first connection portion, and the second connection portion formed integrally together comprises:

1) disposing a cut portion in a mold, the cut portion comprising a flat surface portion with a quadrangular shape, and a first cut portion side surface portion and a second cut portion side surface portion which are side surface portions extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

2) integrally forming injection molding a resin to form a projectile and integrally molding together the projectile and the cut portion, with the flat surface portion of the cut portion being in contact with an end surface of the projectile, the first through hole of the first cut portion side surface portion of the cut portion being placed on a first fixing pin formed on a first side surface portion of the projectile, and the second through hole of the second cut portion side surface portion of the cut portion being placed on a second fixing pin formed on a second side surface portion of the projectile; and 3) integrally forming the projectile, the cut portion, the first connection portion, and the second connection portion and obtaining a cut composite by placing a first attachment hole of the first connection portion on the first fixing pin and placing a second attachment hole of the second connection portion on the second fixing pin, then deforming the first fixing pin and the second fixing pin.

A method according to an embodiment of the present invention of manufacturing the second composite of the electric circuit breaker device of the second embodiment comprising the projectile, the cut portion, the first connection portion, the second connection portion, and the bottom clip formed integrally together comprises:

1) disposing a cut portion, a first connection portion, and a second connection portion in a mold, the cut portion comprising a flat surface portion with a quadrangular shape, and a first cut portion side surface portion and a second cut portion side surface portion which are side surface portions extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion, the first connection portion comprising a first flat portion with a rectangular shape in a plan view and a first connection terminal extending down from one of opposing short side edges of the first flat portion, the first connection terminal comprising a first attachment hole formed through the first connection terminal in a thickness direction, and the second connection portion comprising a second flat portion with a rectangular shape in a plan view and a second connection terminal extending down from one of opposing short side edges of the second flat portion, the second connection terminal comprising a second attachment hole formed through the second connection terminal in a thickness direction, in a manner such that the first through hole of the cut portion and the first attachment hole of the first connection portion are aligned concentric with one another and the second through hole of the cut portion and the second attachment hole of the second connection terminal are aligned concentric with one another; and 2) obtaining a second composite via injection molding of a resin.

A method according to an embodiment of the present invention of manufacturing the third composite of the electric circuit breaker device of the third embodiment comprising the projectile, the cut portion, the first connection portion, the second connection portion, and the inner wall surface of the cylindrical space of the housing formed integrally together comprises:

1) disposing a housing comprising an open ended cylindrical space in a mold;

2) disposing a first connection portion, a cut portion, and a second connection portion in the mold at an opening portion of a cylindrical space of the housing on a second end portion side, the cut portion comprising a flat surface portion with a quadrangular shape comprising a through hole that forms a resin-injection hole, and a first cut portion side surface portion and a second cut portion side surface portion which are side surface portions extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion, the first connection portion comprising a first flat portion with a rectangular shape in a plan view and a first connection terminal extending down from one of opposing short side edges of the first flat portion, the first connection terminal comprising a first attachment hole formed through the first connection terminal in a thickness direction, and the second connection portion comprising a second flat portion with a rectangular shape in a plan view and a second connection terminal extending down from one of opposing short side edges of the second flat portion, the second connection terminal comprising a second attachment hole formed through the second connection terminal in a thickness direction, in a manner such that the first through hole of the cut portion and the first attachment hole of the first connection portion are aligned concentric with one another and the second through hole of the cut portion and the second attachment hole of the second connection terminal are aligned concentric with one another; and 3) forming a cut composite at an opening portion of the cylindrical space on the second end portion side via injection molding of a resin injected from the through hole that forms a resin-injection hole of the cut portion.

BRIEF DESCRIPTION OF DRAWINGS

The present invention will be more fully understood from the detailed description given hereinbelow and the accompanying drawings, which are given for explanation only and do not limit the present invention.

FIG. 1A is a cross-sectional view in the axial direction of a cut composite used in an electric circuit breaker device. FIG. 1B is a cross-sectional view of an enlarged portion of an embodiment different from that of FIG. 1A. FIG. 1C is a cross-sectional view in the axial direction of an electric circuit breaker device including the cut composite of FIG. 1A.

FIG. 4A is a cross-sectional view in the axial direction of a second composite used in an electric circuit breaker device. FIG. 4B is a cross-sectional view in the axial direction of an electric circuit breaker device including the second composite of FIG. 4A.

FIG. 5A is a cross-sectional view in the axial direction of a third composite used in an electric circuit breaker device. FIG. 5B is a cross-sectional view in the axial direction of an electric circuit breaker device including the third composite of FIG. 5A.

DESCRIPTION OF EMBODIMENTS

Figure 1A:
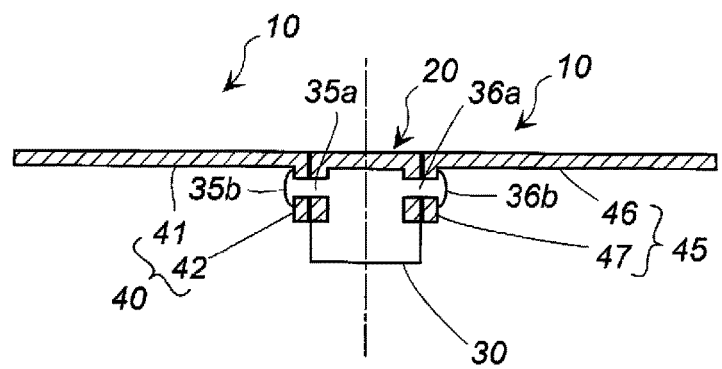
FIGS. 1A, 1B, and 1C are diagrams for describing a method of assembling an electric circuit breaker device.

As can be seen from FIG. 1 and the like of US 2005/0083164 A, US 2005/0083165 A, and JP 2014-49300 A, when a polymer material (resin material) is used, a housing (casing) must be thick to ensure the required strength. When a casing 13 made of stainless steel is used, the mass is increased and an insulation case 14 is required to be a part of the assembly. This increases the complexity of the structure and assembly.

The present invention provides an electric circuit breaker device in which a conductor portion including a plurality of components are assembled together is used, the conductor portion being easily cut due to the components of the conductor portion being connected via resin, and a method of manufacturing a composite used therein.

In the electric circuit breaker device according to an embodiment of the present invention, the housing is made of synthetic resin, and the external shape is appropriately selected according to the attachment portion. The housing has a shape, structure, and size that allows components such as the igniter, the projectile, the cylinder, and the conductor portion to be housed and installed therein.

The igniter may be a known igniter used in electric circuit breaker devices or may be an igniter used as a gas igniter of an airbag device in a vehicle. The igniter includes an ignition portion including an ignition charge and a conduction pin for conducting electricity. At the time of actuation, the igniter combusts the ignition charge by applying electric power from an external power source, and generates combustion products such as combustion gas and flames.

The bottom clip preferably is made of the same resin as the housing is and includes the recess portion that forms the insulation space. The bottom clip and the housing are integrally formed around the conductors with the opening portion of the recess portion of the bottom clip and the opening portion of the cylindrical space of the housing.

The electric circuit breaker device of the first embodiment includes a cut composite including a projectile made of synthetic resin, a cut portion, a first connection portion, and a second connection portion formed integrally together. The projectile and the conductor portion are fixed together by the first fixing pin of the projectile being inserted in the first through hole of the cut portion and the first attachment hole of the first connection portion (first connection terminal) and, in this state, the end portion being deformed and by the second fixing pin of the projectile being inserted in the second through hole of the cut portion and the second attachment hole of the second connection portion (second connection terminal) and, in this state, the end portion being deformed.

The first side surface portion of the cut portion and the first connection terminal are connected, forming two layers in the thickness direction, and the second side surface portion of the cut portion and the second connection terminal are connected, forming two layers in the thickness direction.

The first through hole and the second through hole of the cut portion may have a constant inner diameter or the diameter may continuously increase from one to the other.

The first attachment hole of the first connection terminal and the second attachment hole of the second connection terminal may have a constant inner diameter or the diameter may continuously increase from one to the other.

The inner diameter of the first through hole and the second through hole of the cut portion, the inner diameter of the first attachment hole of the first connection terminal, and the inner diameter of the second attachment hole of the second connection terminal may be the same diameter. However, preferably, when the first through hole of the cut portion and the first attachment hole of the first connection terminal are aligned, the diameter of the hole formed continuously increases from the first through hole toward the first attachment hole, and when the second through hole of the cut portion and the second attachment hole of the second connection terminal are aligned, the diameter of the hole formed continuously increases from the second through hole toward the second attachment hole. In this manner, when the diameter of the hole continuously increases from the first through hole toward the first attachment hole and the diameter of the hole continuously increases from the second through hole toward the second attachment hole, the first fixing pin and the second fixing pin is given a shape that corresponds to the shape of the formed hole. This increases the bonding strength.

The first fixing pin includes a first cylinder portion on the first side surface portion side and a first end increased diameter portion on the end side. The outer diameter of the first cylinder portion is less than the outer diameter of the first end increased diameter portion. The first end increased diameter portion is a portion given a large outer diameter by deforming the end portion of the first cylinder portion.

The second fixing pin includes a second cylinder portion on the second side surface portion side and a second end increased diameter portion on the end side. The outer diameter of the second cylinder portion is less than the outer diameter of the second end increased diameter portion. The second end increased diameter portion is a portion given a large outer diameter by deforming the end portion of the second cylinder portion.

The end portion of the first fixing pin and the end portion of the second fixing pin is squashed by force being applied, deformed by being squashed after being melted via heat, or squashed by force and heat being applied.

In this way, the cut portion and the first connection portion are joined by the synthetic resin first fixing pin, and the cut portion and the second connection portion are joined by the synthetic resin second fixing pin. Thus, upon actuation, the synthetic resin pin is broken, cutting apart the cut portion and the first connection portion and cutting apart the cut portion and the second connection portion. This allows the cutting be achieved by a smaller force than in a configuration in which a wholly metal cut portion of the conductor portion is cut. Furthermore, in a configuration in which a wholly metal conductor portion is formed with a notch portion, i.e., a fragile portion, the width of the portion where the notch portion is formed is narrow. Thus, when electric flows, heat easily builds up in this portion, requiring the cut portion to be made thickness to suppress this heat build-up. In the first embodiment, a notch portion is not required.

The electric circuit breaker device of the second embodiment is different from the first embodiment in that it includes the second composite that includes the projectile, the cut portion, the first connection portion, and the second connection portion integrally formed also with the inner wall surface of the recess portion of the bottom clip.

In the electric circuit breaker device of the second embodiment, the projectile and the cut portion are integrally formed together and the first connection portion and the second connection portion are joined to the cut portion via the first fixing pin and the second fixing pin of the projectile. This gives the second embodiment the same effects as the first embodiment.

The electric circuit breaker device of the third embodiment is different from the first embodiment in that it includes the third composite that includes the projectile, the cut portion, the first connection portion, and the second connection portion integrally formed also with the inner wall surface of the cylindrical space of the housing.

In the electric circuit breaker device of the third embodiment, the projectile and the cut portion are integrally formed together and the first connection portion and the second connection portion are joined to the cut portion via the first fixing pin and the second fixing pin of the projectile. This gives the second embodiment the same effects as the first embodiment.

According to the present invention, the conductor portion can be easily cut and the output of the igniter required to cut the conductor portion can be reduced, allowing the size of the igniter and the electric circuit breaker device to be reduced. Also, a fragile portion such as a notch does not need to be formed in the conductor portion. This reduces the problem of heat build-up in the fragile portion upon actuation.

EMBODIMENTS OF THE INVENTION

Figure 1B:
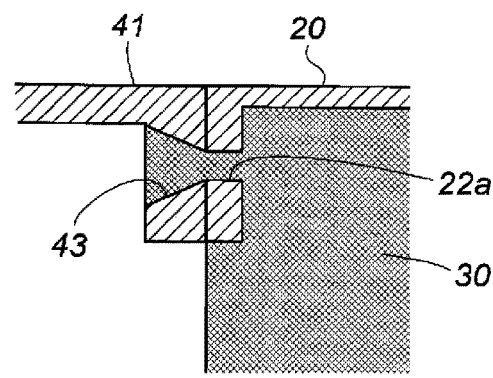
Figure 1C:
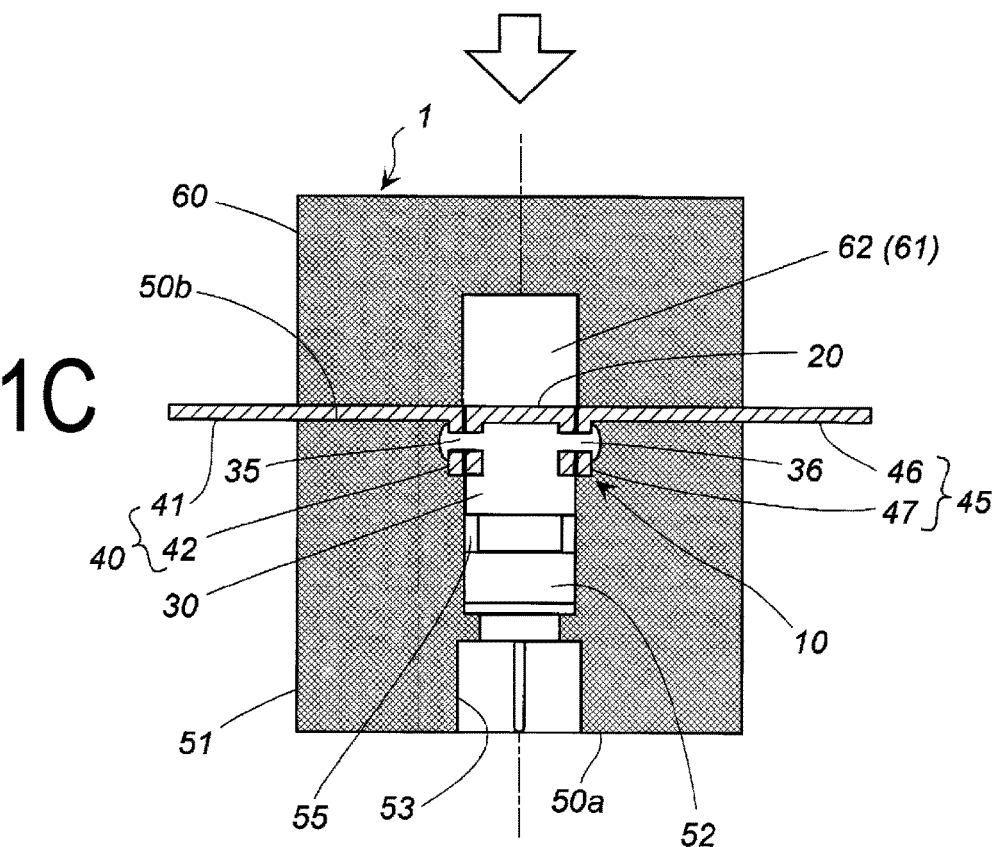

Electric Circuit Breaker Device Illustrated in FIGS. 1A to 1C

An electric circuit breaker device 1 according to an embodiment of the present invention will be described with reference to FIG. 1 and FIG. 2.

The electric circuit breaker device 1 illustrated in FIG. 1C includes a cut composite 10 disposed inside an assembly of a housing 51 and a bottom clip 60. The cut composite 10 includes a projectile 30 and a conductor portion (a cut portion 20, a first connection portion 40, and a second connection portion 45) integrally formed together. The housing 51 and the bottom clip 60 are both made of synthetic resin.

The projectile 30 is made of synthetic resin and includes an end surface 31 with a quadrangular shape, with a first side surface portion 32 and a second side surface portion 33 connected to opposing edges of the end surface 31. The projectile 30 also includes a first fixing pin 35 and a second fixing pin 36 jutting out from the first side surface portion 32 and the second side surface portion 33, respectively. The shape of the end surface 31 is preferably a square or a rectangle.

The first fixing pin 35 includes a first cylinder portion 35a on the first side surface portion 32 side and a first end increased diameter portion 35b on the end side. The outer diameter of the first cylinder portion 35a is less than the outer diameter of the first end increased diameter portion 35b.

The second fixing pin 36 includes a second cylinder portion 36a on the second side surface portion 33 side and a second end increased diameter portion 36b on the end side. The outer diameter of the second cylinder portion 36a is less than the outer diameter of the second end increased diameter portion 36b.

A conductor portion is a plate portion including the first connection portion 40 and the second connection portion 45 on opposite sides and the cut portion 20 as an intermediate portion. The conductor portion is configured to form a portion of the electric circuit when the electric circuit breaker device 1 is part of an electric circuit.

The first connection portion 40 and the second connection portion 45 are configured to connect to other conductors in the electric circuit (e.g., a lead wire). The cut portion 20 is configured to be cut and interrupt the electric circuit when activated.

The cut portion 20 includes a flat surface portion 21 with a quadrangular shape, a first cut portion side surface portion 22 and a second cut portion side surface portion 23 extending down in the same direction from opposing edges of the flat surface portion 21 with the quadrangular shape, and a first through hole 22a and a second through hole 23a formed in the thickness direction of the first cut portion side surface portion 22 and the second cut portion side surface portion 23, respectively. The flat surface portion 21 with the quadrangular shape preferably has a square shape or a rectangular shape. The shape of the quadrangular may be the same as the shape of the end surface 31 or different. However, the width of the flat surface portion 21 with the quadrangular shape is preferably less than the width of the end surface 31 to ensure that it is easily cut. For example, preferably the flat surface portion 21 has a rectangular shape and the end surface 31 has a square shape, and the length of the short sides of the rectangular shape is less than the length of the sides of the square shape. The cut portion 20 does not require a fragile portion such as a notch to make it easier to cut.

The first connection portion 40 includes a first flat portion 41 with a rectangular shape as seen in a plan view, a first connection terminal 42 extending down from one of opposing short side edges of the first flat portion 41. The first connection terminal 42 includes a first attachment hole 43 formed through the first connection terminal 42 in the thickness direction.

The second connection portion 45 includes a second flat portion 46 with a rectangular shape as seen in a plan view, a second connection terminal 47 extending down from one of opposing short side edges of the second flat portion 46. The second connection terminal 47 includes a second attachment hole 48 formed through the second connection terminal 47 in the thickness direction.

Figure 2A:
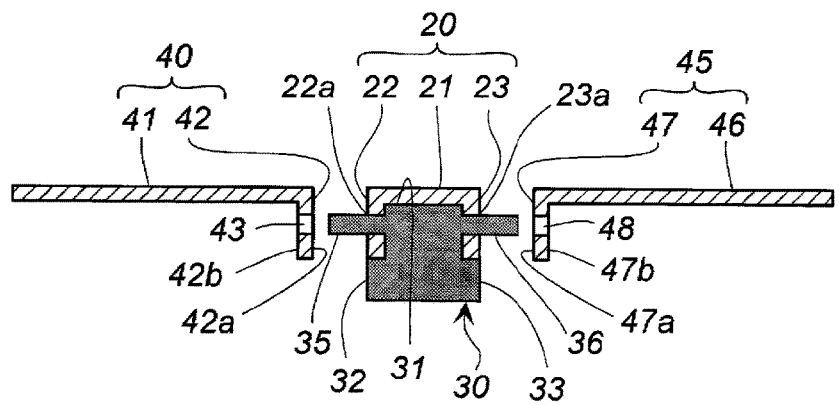
FIGS. 2A to 2C are diagrams for describing a method of manufacturing the cut composite illustrated in FIG. 1A.
Figure 2B:
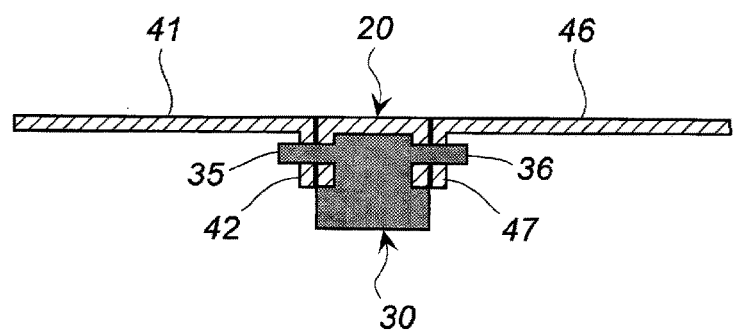
Figure 2C:
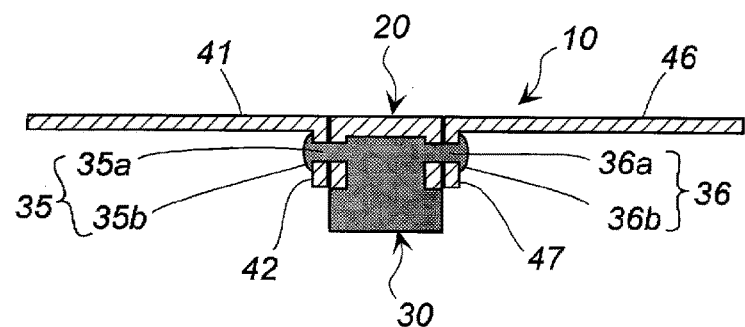

As illustrated in FIGS. 1A and 2C, the cut composite 10 includes the cut portion 20 and the projectile 30 integrally formed together and the first connection portion 40 and the second connection portion 45 joined thereto.

The cut portion 20 and the projectile 30 are integrally formed together in the following manner: the flat surface portion 21 of the cut portion 20 is in contact with the end surface 31 of the projectile 30, the first through hole 22a of the first cut portion side surface portion 22 of the cut portion 20 is placed on the first cylinder portion 35a of the first fixing pin 35 formed on the first side surface portion 32 of the projectile 30, and the second through hole 23a of the second cut portion side surface portion 23 of the cut portion 20 is placed on the second cylinder portion 36a of the second fixing pin 36 formed on the second side surface portion 33 of the projectile 30.

The first attachment hole 43 of the first connection terminal 42 is placed over the first through hole 22a of the cut portion 20 placed on the first cylinder portion 35a of the first fixing pin 35. In this way, by the first surface 42a of the first connection terminal 42 and the first cut portion side surface portion 22 of the cut portion 20 being in contact with one another and an inner surface of the first end increased diameter portion 35b being pressed onto a second surface 42b of the first connection terminal 42, the cut portion 20 and the first connection terminal 42 are electrically connected. The first end increased diameter portion 35b pushes against the first connection terminal 42 from the outside.

The second attachment hole 48 of the second connection terminal 47 is placed over the second through hole 23a of the cut portion 20 placed on the first cylinder portion 36a of the second fixing pin 36. In this way, by a first surface 47a of the second connection terminal 47 and the second cut portion side surface portion 23 of the cut portion 20 being in contact with one another and an inner surface of the second end increased diameter portion 36 being pressed onto a second surface 47b of the second connection terminal 47, the cut portion 20 and the second connection terminal 47 are electrically connected. The second end increased diameter portion 36b pushes against the second connection terminal 47 from the outside.

FIG. 1B illustrates an embodiment in which the first through hole 22a of the cut portion 20 and the first attachment hole 43 of the first connection terminal 42 are aligned with the hole continuously increasing in diameter from the first through hole 22a toward the first attachment hole 43. Although not illustrated in the drawings, the second through hole 23a and the second attachment hole 48 are also aligned with the hole increasing in diameter from the second through hole 23a toward the second attachment hole 48. In the embodiment illustrated in FIG. 1B, a process of forming the first end increased diameter portion 35b and the second end increased diameter portion 36b is not necessary, and a portion corresponding to the first end increased diameter portion 35b and the second end increased diameter portion 36b can be made via injection molding.

As illustrated in FIG. 1C, an igniter 52 and the cut composite 10 are disposed in that order from a first end portion 50a side of a cylindrical space 55 of the housing 51 toward an axially opposite second end portion 50b side. Also, the bottom clip 60 is disposed on the side of the cut composite 10 opposite to where the igniter 52 is disposed. The bottom clip 60 is made of synthetic resin and includes a recess portion 61.

A connector insertion space 53 is formed between the igniter 52 and the first end portion 50a.

An opening of the recess portion 61 of the bottom clip 60 is closed by the housing 51, forming an insulation space 62. The insulation space 62 is where the cut portion 20 is held after being cut off upon activation.

The housing 51 and the bottom clip 60 can be manufactured, for example, by an assembly of the housing 51, the igniter 52, and the cut composite 10 being disposed in a mold and then subjected to injection molding to form the bottom clip 60, or by integrally forming together an assembly of the housing 51, the igniter 52, and the cut composite 10 with the bottom clip 60 via an adhesive or the like.

The cut portion 20 of the cut composite 10 is orientated orthogonal to the housing 51 (the bottom clip 60) and disposed facing the insulation space 62.

In the electric circuit breaker device 1 illustrated in FIG. 1C, a cylinder may be disposed between the igniter 52 and the housing 51. The cylinder used can be a partially modified cylinder of that illustrated in FIG. 1 and FIG. 2 of JP 2016-85947 A, for example.

Next, the action of the electric circuit breaker device 1 illustrated in FIG. 1C when disposed in the electric circuit of an electric vehicle is described. The electric circuit breaker device 1 illustrated in FIGS. 1A to 1C, together with an abnormal-current detecting sensor and the like, can automatically actuate when an abnormal current flows through the electric circuit and can also be actuated by a human action.

In a configuration in which the electric circuit breaker device 1 is disposed in an electric circuit, the conductor portion, i.e., the first connection portion 40 and the second connection portion 45, are configured to connect to the lead wire that forms the electric circuit. When an abnormality occurs in the electric circuit, the igniter 52 activates and a combustion product containing combustion gas is produced from an igniter portion. The combustion product produced from the igniter portion impacts against the projectile 30 of the cut composite 10.

The pressure from the combustion product acts on the projectile 30, making it move in the axial direction. This cuts the first fixing pin 35 joining together the cut portion 20 and the first connection portion 40 and cuts the second fixing pin 36 joining together the cut portion 20 and the second connection portion 45. Instead of the metal cut portion 20, the metal first connection portion 40, and the metal second connection portion 45 being cut directly, the resin first fixing pin 35 and the resin second fixing pin 36 are cut. In this way, the output of the igniter 52 required to cut can be decreased. Then, when the cut portion 20 moves into the insulation space 62, the insulation space 62 is closed off by the integral cut portion 20 and the projectile 30, preventing the cut portion 20 from returning to its original position. This action breaks the electric connection between the first connection portion 40 and the second connection portion 45, and the electric circuit including the electric circuit breaker device 1 is interrupted.

Method of Manufacturing the Cut Composite Illustrated in FIG. 1A

A first method of manufacturing the cut composite 10 illustrated in FIG. 1A will be described with reference to FIG. 1 and FIG. 2.

In the first step, the cut portion 20 (integrally formed with the projectile 30) illustrated in FIG. 2A is disposed in a mold.

In the second step, as illustrated in FIG. 2A, the resin for forming the projectile 30 is injection molded, the flat surface portion 21 of the cut portion 20 is brought in contact with the end surface 31 of the projectile 30, the first through hole 22a of the first cut portion side surface portion 22 of the cut portion 20 is placed on the first fixing pin 35 of the first side surface portion 32 of the projectile 30, and the second through hole 23a of the second cut portion side surface portion 23 of the cut portion 20 is placed on the second fixing pin 36 of the second side surface portion 33 of the projectile 30 to obtain an intermediate molded body.

In the third step, as illustrated in FIGS. 2B and 2C, the first attachment hole 43 of the first connection terminal 42 is placed on the first cylinder portion 35a of the first fixing pin 35 of the intermediate molded body obtained in the second step, and the second attachment hole 48 of the second connection terminal 47 is placed on the second cylinder portion 36a of the second fixing pin 36. Next, the first end increased diameter portion 35b is formed by heat-melting the end portion of the first fixing pin 35 and the second end increased diameter portion 36b is formed from the end portion of the second fixing pin 36 in a similar manner to obtain the cut composite 10.

The first end increased diameter portion 35b pushes the first cut portion side surface portion 22 of the cut portion 20 and the first connection terminal 42 toward the first side surface portion 32 of the projectile 30. Thus, the first cut portion side surface portion 22 of the cut portion 20 and the first connection terminal 42 of the first connection portion 40 are electrically connected.

In this example, the connection portion of the first cut portion side surface portion 22 of the cut portion 20 and the first connection terminal 42 has two layers to prevent heat build-up, making it thicker than the flat surface portion 21 of the cut portion 20 and the first flat portion 41 of the first connection portion 40.

The second end increased diameter portion 36b pushes the second cut portion side surface portion 23 of the cut portion 20 and the second connection terminal 47 toward the second side surface portion 33 of the projectile 30. Thus, the second cut portion side surface portion 23 of the cut portion 20 and the second connection terminal 47 of the second connection portion 45 are electrically connected.

In this example, the connection portion of the second cut portion side surface portion 23 of the cut portion 20 and the second connection terminal 47 has two layers to prevent heat build-up, making it thicker than the flat surface portion 21 of the cut portion 20 and the second flat portion 46 of the second connection portion 45.

Figure 3:
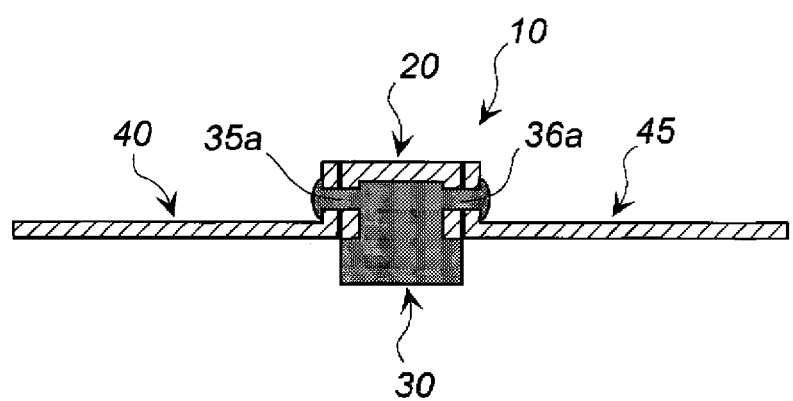
FIG. 3 is a cross-sectional view in the axial direction of a cut composite of an embodiment with a different structure than that of the embodiment of FIG. 2C.

The cut composite 10 of FIG. 3 is the same as the cut composite 10 of FIG. 2C, except that the orientation of the first connection portion 40 and the orientation of the second connection portion 45 are different.

Instead of the first to third steps described above, a method of manufacturing can be performed that includes the following steps.

In the first step, as the projectile 30, a projectile including a first hole and a second hole formed at the same position as the first side surface portion 32 and the second side surface portion respectively is prepared.

In the second step, the cut portion 20 is fit on the projectile 30, the first hole of the first side surface portion 32 is aligned with the first through hole 22a, and the second hole of the second side surface portion 33 is aligned with the second through hole 23a.

In the third step, the first attachment hole 43 of the first connection terminal 42 is aligned with the first hole and the first through hole 22a, and the second attachment hole 48 of the second connection terminal 47 is aligned with the second hole and the second through hole 23a.

In the fourth step, a first rivet (the first fixing pin 35) made of synthetic resin is inserted in the first hole, the first through hole 22a, and the first attachment hole 43. Then, the portion of the first rivet that protrudes from the first attachment hole 43 is heat-melted to form the first end increased diameter portion 35b. Also, a second rivet (the second fixing pin 36) made of synthetic resin is inserted in the second hole, the second through hole 23a, and the second attachment hole 48. Then, the portion of the second rivet that protrudes from the second attachment hole 48 is heat-melted to form the second end increased diameter portion 36b. In this way, the cut composite 10 is obtained.

The igniter 52 is inserted and disposed inside the housing 51. Next, the article including the cut composite 10 is placed in a mold, and resin is injection molded to form the bottom clip 60. In this way, the electric circuit breaker device 1 illustrated in FIG. 1C can be manufactured.

Figure 4A:
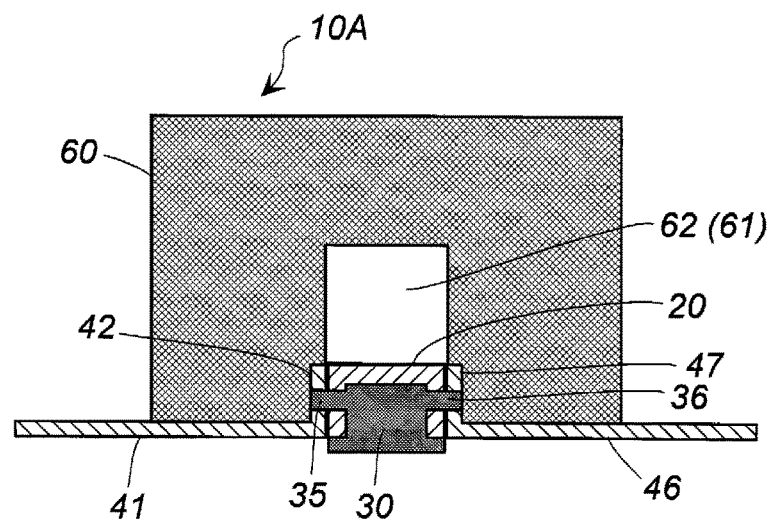
FIGS. 4A and 4B are diagrams for describing a method of assembling an electric circuit breaker device of an embodiment different from the embodiment of FIG. 1.
Figure 4B:
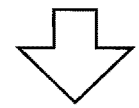
Figure 4B:
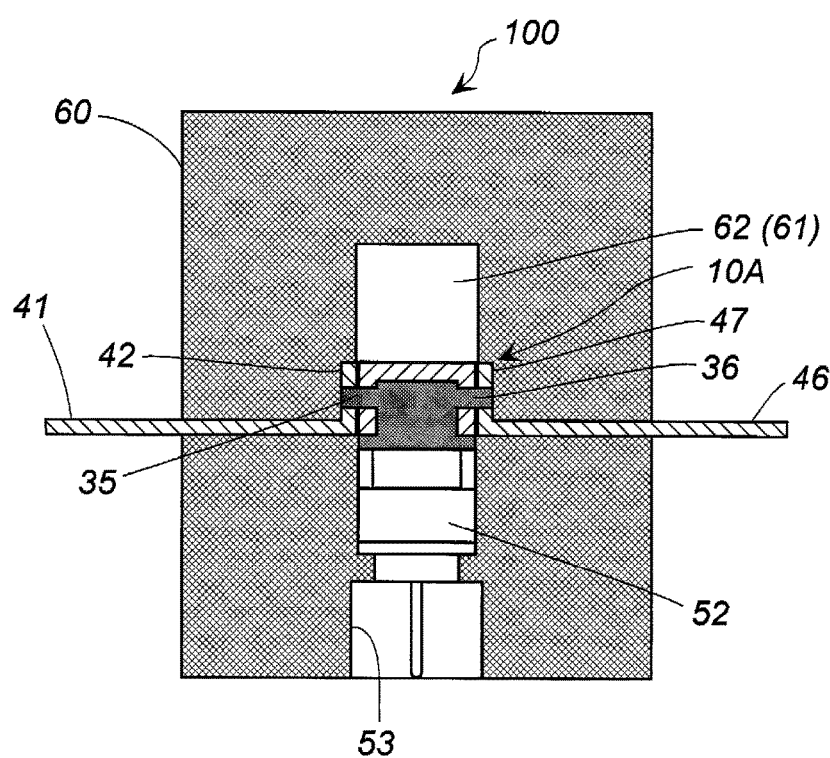

Electric Circuit Breaker Device Illustrated in FIG. 4B

A second composite 10A illustrated in FIG. 4A used in the electric circuit breaker device illustrated in FIG. 4B is the same as the cut composite 10 illustrated in FIG. 1A, except that the bottom clip 60 and the part corresponding to the cut composite 10 are integrally formed. However, the first connection portion 40 and the second connection portion 45 are attached with the same orientation as in the embodiment illustrated in FIG. 3.

The second composite 10A includes the projectile 30, the cut portion 20, the first connection portion 40, the second connection portion 45, and the bottom clip 60 all integrally formed together.

The flat surface portion 21 of the cut portion 20 is in contact with the end surface 31 of the projectile 30, and the first through hole 22a of the first cut portion side surface portion 22 and the second through hole 23a of the second cut portion side surface portion 23 of the cut portion 20 are placed on, respectively, the first fixing pin 35 of the first side surface portion 32 and the second fixing pin 36 of the second side surface portion 33 of the projectile 30.

A first attachment hole 43 of the first connection terminal 42 of the first connection portion 40 is placed on the first fixing pin 35 on which is placed the first through hole 22a of the cut portion 20, and the second attachment hole 48 of the second connection terminal 47 of the second connection portion 45 is placed on the second fixing pin 36 on which is placed the second through hole 23a of the cut portion 20.

The end portion of the first fixing pin 35 on the opposite side from the connection portion of the first fixing pin 35 and the projectile 30 and the end portion of the second fixing pin 36 on the opposite side from the connection portion of the second fixing pin 36 and the projectile 30 are integrally formed with the inner wall surface of the recess portion 61 of the bottom clip 60.

The first connection terminal 42 and the first cut portion side surface portion 22 of the cut portion 20 form two layers and are electrically connected. The second connection terminal 47 and the second cut portion side surface portion 23 of the cut portion 20 form two layers and are electrically connected.

Method of Manufacturing the Second Composite 10A Illustrated in FIG. 4A

The method of manufacturing the second composite 10A illustrated in FIG. 4A will be described.

In the first step, the conductor portion (the cut portion 20, the first connection portion 40, and the second connection portion 45) is disposed in a mold.

In the first step, the cut portion 20, the first connection portion 40, and the second connection portion 45 are aligned with the first through hole 22a of the cut portion 20 and the first attachment hole 43 of the first connection terminal 42 concentrically aligned and the second through hole 23a of the cut portion 20 and the second attachment hole 48 of the second connection terminal 47 concentrically aligned.

In the second step, the resin is injection molded and the second composite 10A illustrated in FIG. 4A is obtained. The second composite 10A of FIG. 4A is disposed in the mold, and the resin is injection molded to form the housing 51. Then, the igniter 52 is inserted. In this way, the electric circuit breaker device 100 illustrated in FIG. 4B can be manufactured.

Figure 5A:
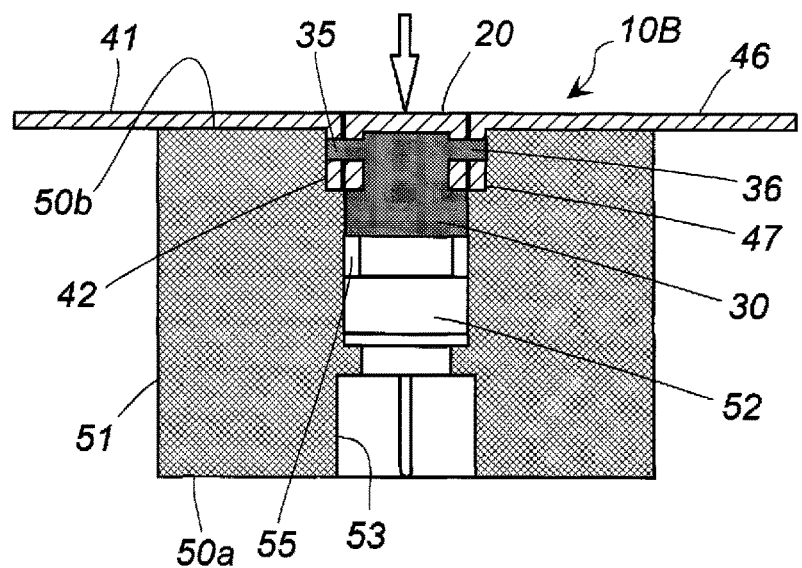
FIGS. 5A and 5B are diagrams for describing a method of assembling an electric circuit breaker device of an embodiment different from the embodiment of FIG. 1.
Figure 5B:
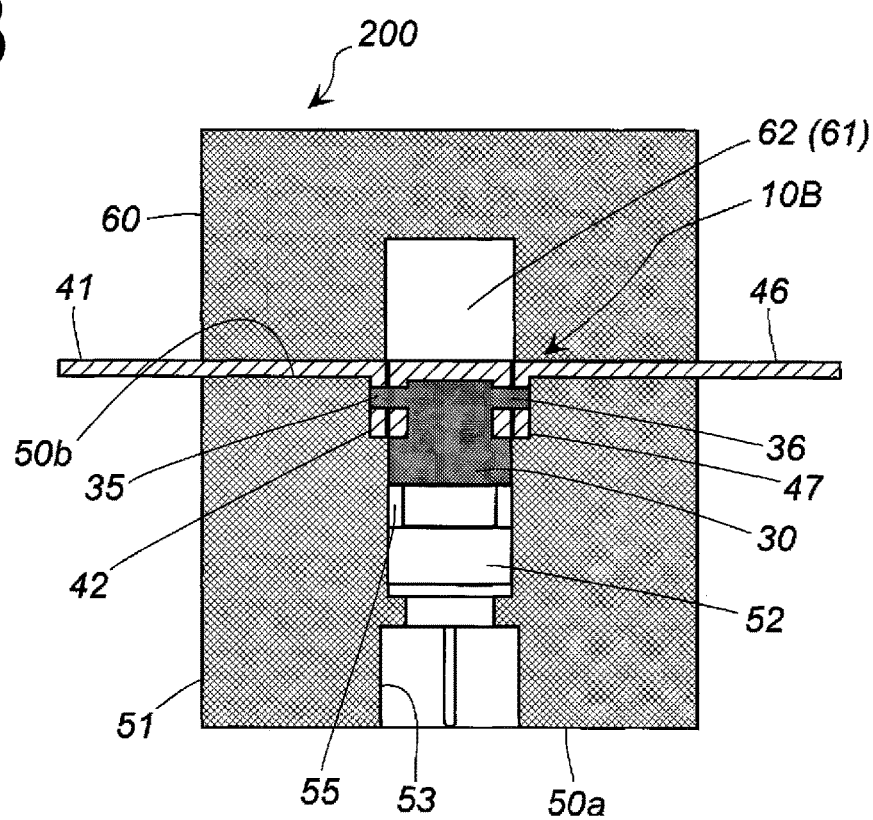

Electric Circuit Breaker Device Illustrated in FIG. 5B

A second composite 10B illustrated in FIG. 5A used in the electric circuit breaker device illustrated in FIG. 5B is the same as cut composite 10 illustrated in FIG. 1A, except that the housing 51 and the part corresponding to the cut composite 10 are integrally formed.

The second composite 10B includes the projectile 30, the cut portion 20, the first connection portion 40, the second connection portion 45, and the housing 51 all integrally formed together.

The flat surface portion 21 of the cut portion 20 is in contact with the end surface 31 of the projectile 30, and the first through hole 22a of the first cut portion side surface portion 22 and the second through hole 23a of the second cut portion side surface portion 23 of the cut portion 20 are placed on, respectively, the first fixing pin 35 of the first side surface portion 32 and the second fixing pin 36 of the second side surface portion 33 of the projectile 30.

A first attachment hole 43 of the first connection terminal 42 of the first connection portion 40 is placed on the first fixing pin 35 on which is placed the first through hole 22a of the cut portion 20, and the second attachment hole 48 of the second connection terminal 47 of the second connection portion 45 is placed on the second fixing pin 36 on which is placed the second through hole 23a of the cut portion 20.

The end portion of the first fixing pin 35 on the opposite side from the connection portion of the first fixing pin 35 and the projectile 30 and the end portion of the second fixing pin 36 on the opposite side from the connection portion of the second fixing pin 36 and the projectile 30 are integrally formed with the inner wall surface of the cylindrical space 55 of the housing 51.

The first connection terminal 42 and the first cut portion side surface portion 22 of the cut portion 20 form two layers and are electrically connected. The second connection terminal 47 and the second cut portion side surface portion 23 of the cut portion 20 form two layers and are electrically connected.

Method of Manufacturing the Third Composite 10B Illustrated in FIG. 5A

The method of manufacturing the third composite 10B illustrated in FIG. 5A will be described.

In the first step, the housing 51 including the open ended cylindrical space 55 is disposed in a mold.

In the second step, the conductor portion (the first connection portion 40, the cut portion 20, and the second connection portion 45) is also disposed in the mold at the opening portion of the cylindrical space 55 of the housing 51 on the second end portion 50b side.

The cut portion 20 includes a flat surface portion 21 with a quadrangular shape that includes a resin-injection hole that is a through hole (not illustrated), a first cut portion side surface portion 22 and a second cut portion side surface portion 23 extending down in the same direction from opposing edges of the flat surface portion 21 with a quadrangular shape, and a first through hole 22a and a second through hole 23a formed in the thickness direction of the first cut portion side surface portion 22 and the second cut portion side surface portion 23, respectively. The above-described resin-injection hole is not necessarily provided in the cut portion 20 used in the electric circuit breaker device 1 illustrated in FIGS. 1A to 1C, and a through hole may be provided instead.

The first connection portion 40 and the second connection portion 45 are the same as those used in the electric circuit breaker device 1 illustrated in FIGS. 1A to 1C.

In the second step, the cut portion 20 and the first connection portion 40 are aligned with the first through hole 22a of the cut portion 20 and the first attachment hole 43 of the first connection terminal 42 concentrically aligned and the second through hole 23a of the cut portion 20 and the second attachment hole 48 of the second connection terminal 47 concentrically aligned. Then, resin is injected from the resin-injection hole, i.e., through hole, of the cut portion 20 for injection molding, and the cut composite 10 is formed at the opening portion of the cylindrical space on the second end portion 50a side.

The article (the third composite 10B) including the housing 51 and the cut composite 10 of FIG. 5A is placed in a mold, and resin is injection molded to form the bottom clip 60. In this way, an electric circuit breaker device 200 illustrated in FIG. 5B can be manufactured.

The electric circuit breaker device of an embodiment of the present invention can be disposed in various types of electric circuits and is particularly suited to be used in an electric circuit including a battery (e.g., lithium ion battery) of a vehicle, an electric circuit of an electric vehicle, an electric circuit of an electric home appliance, a power station, a solar power generation device, a distribution board of various types of factories, and a stationary battery using an industrial battery such as an industrial lithium ion battery and an industrial lead storage battery.

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. An electric circuit breaker device, comprising:
   in a housing made of synthetic resin comprising a cylindrical space open at both ends,
   an igniter, a resin projectile, and a conductor portion that forms a portion of an electric circuit disposed in this order from a first end portion side of the cylindrical space of the housing toward an axially opposite second end portion side of the housing; and a bottom clip made of synthetic resin comprising a recess portion that forms an insulation space disposed on a side of the conductor portion opposite to where the igniter and the projectile are disposed, the insulation space being formed by the recess portion of the bottom clip closing off the housing; wherein the resin projectile comprises an end portion with a quadrangular shape, a first side surface portion and a second side surface portion connected to opposing edges of an end surface of the end portion, and a first fixing pin jutting out from the first side surface portion and a second fixing pin jutting out from the second side surface portion;

the first fixing pin comprises a first cylinder portion located on a side of the first fixing pin closer to the first side surface portion and a first end increased diameter portion located on a side of the first fixing pin closer to an end, an outer diameter of the first cylinder portion being less than an external diameter of the first end increased diameter portion;

the second fixing pin comprises a second cylinder portion located on a side of the second fixing pin closer to the second side surface portion and a second end increased diameter portion located on a side of the second fixing pin closer to an end, an outer diameter of the second cylinder portion being less than an external diameter of the second end increased diameter portion;

the conductor portion is a plate portion comprising a first connection portion and a second connection portion on opposite sides and a cut portion as an intermediate portion;

the cut portion comprises a flat surface portion with a quadrangular shape, and a first cut portion side surface portion and a second cut portion side surface portion extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

the first connection portion comprises a first flat portion with a rectangular shape in a plan view and a first connection terminal extending down from one of opposing short side edges of the first flat portion, the first connection terminal comprising a first attachment hole formed through the first connection terminal in a thickness direction;

the second connection portion comprises a second flat portion with a rectangular shape in a plan view and a second connection terminal extending down from one of opposing short side edges of the second flat portion, the second connection terminal comprising a second attachment hole formed through the second connection terminal in a thickness direction;

the projectile, the cut portion, the first connection portion, and the second connection portion are integrally formed as a cut composite;

in the cut composite, the flat surface portion of the cut portion is in contact with the end surface of the projectile, the first through hole of the first cut portion side surface portion of the cut portion is placed on the first cylinder portion of the first fixing pin formed on the first side surface portion of the projectile, the first attachment hole of the first connection terminal is also placed on the first cylinder portion, a first surface side of the first connection terminal is in contact with the first cut portion side surface portion, and a second surface side of the first connection terminal is in contact with an inner surface of the first end increased diameter portion, the second through hole of the second cut portion side surface portion of the cut portion is placed on the second cylinder portion of the second fixing pin formed on the second side surface portion of the projectile, the second attachment hole of the second connection terminal is also placed on the second cylinder portion, a first surface side of the second connection terminal is in contact with the second cut portion side surface portion, and a second surface side of the second connection terminal is in contact with an inner surface of the second end increased diameter portion; and the cut portion is orientated orthogonal to the housing and disposed facing the insulation space.

2. An electric circuit breaker device, comprising:

in a housing made of synthetic resin comprising a cylindrical space open at both ends, an igniter, a resin projectile, and a conductor portion that forms a portion of an electric circuit disposed in this order from a first end portion side of the cylindrical space of the housing toward an axially opposite second end portion side of the housing; and a bottom clip made of synthetic resin comprising a recess portion that forms an insulation space disposed on a side of the conductor portion opposite to where the igniter and the projectile are disposed, the insulation space being formed by the recess portion of the bottom clip closing off the housing; wherein the resin projectile comprises an end portion with a quadrangular shape, a first side surface portion and a second side surface portion connected to opposing edges of an end surface of the end portion, and a first fixing pin jutting out from the first side surface portion and a second fixing pin jutting out from the second side surface portion;

the conductor portion is a plate portion comprising a first connection portion and a second connection portion on opposite sides and a cut portion as an intermediate portion;

the cut portion comprises a flat surface portion with a quadrangular shape, and a first cut portion side surface portion and a second cut portion side surface portion extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

the first connection portion comprises a first flat portion with a rectangular shape in a plan view and a first connection terminal extending down from one of opposing short side edges of the first flat portion, the first connection terminal comprising a first attachment hole formed through the first connection terminal in a thickness direction;

the second connection portion comprises a second flat portion with a rectangular shape in a plan view and a second connection terminal extending down from one of opposing short side edges of the second flat portion, the second connection terminal comprising a second attachment hole formed through the second connection terminal in a thickness direction;

the projectile, the cut portion, the first connection portion, the second connection portion, and the bottom clip are integrally formed as a second composite;

in the second composite, the flat surface portion of the cut portion is in contact with the end surface of the projectile, the first through hole of the first cut portion side surface portion of the cut portion is placed on the first fixing pin formed on the first side surface portion of the projectile, the first attachment hole of the first connection terminal is also placed on the first fixing pin, and a first surface side of the first connection terminal is in contact with the first cut portion side surface portion, the second through hole of the second cut portion side surface portion of the cut portion is placed on the second fixing pin formed on the second side surface portion of the projectile, the second attachment hole of the second connection terminal is also placed on the second fixing pin, a second surface side of the second connection terminal is in contact with the second cut portion side surface portion, and an end portion of the first fixing pin on an opposite side from where the projectile is located and an end portion of the second fixing pin on an opposite side from where the projectile is located are integrally formed with an inner wall surface of the recess portion of the bottom clip; and the cut portion is orientated orthogonal to the housing and disposed facing the insulation space.

3. An electric circuit breaker device, comprising:

in a housing made of synthetic resin comprising a cylindrical space open at both ends, an igniter, a resin projectile, and a conductor portion that forms a portion of an electric circuit disposed in this order from a first end portion side of the cylindrical space of the housing toward an axially opposite second end portion side of the housing; and a bottom clip made of synthetic resin comprising a recess portion that forms an insulation space disposed on a side of the conductor portion opposite to where the igniter and the projectile are disposed, the insulation space being formed by the recess portion of the bottom clip closing off the housing; wherein the resin projectile comprises an end portion with a quadrangular shape, a first side surface portion and a second side surface portion connected to opposing edges of an end surface of the end portion, and a first fixing pin jutting out from the first side surface portion and a second fixing pin jutting out from the second side surface portion;

the conductor portion is a plate portion comprising a first connection portion and a second connection portion on opposite sides and a cut portion as an intermediate portion;

the cut portion comprises a flat surface portion with a quadrangular shape, and a first cut portion side surface portion and a second cut portion side surface portion extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

the first connection portion comprises a first flat portion with a rectangular shape in a plan view and a first connection terminal extending down from one of opposing short side edges of the first flat portion, the first connection terminal comprising a first attachment hole formed through the first connection terminal in a thickness direction;

the second connection portion comprises a second flat portion with a rectangular shape in a plan view and a second connection terminal extending down from one of opposing short side edges of the second flat portion, the second connection terminal comprising a second attachment hole formed through the second connection terminal in a thickness direction;

the projectile, the cut portion, the first connection portion, and the second connection portion are integrally formed as a third composite;

in the third composite, the flat surface portion of the cut portion is in contact with the end surface of the projectile, the first through hole of the first cut portion side surface portion of the cut portion is placed on a first fixing pin formed on the first side surface portion of the projectile, the first attachment hole of the first connection terminal is also placed on the first fixing pin, and a first surface side of the first connection terminal is in contact with the first cut portion side surface portion, the second through hole of the second cut portion side surface portion of the cut portion is placed on the second fixing pin formed on a second side surface portion of the projectile, the second attachment hole of the second connection terminal is also placed on the second fixing pin, a second surface side of the second connection terminal is in contact with the second cut portion side surface portion, and an end portion of the first fixing pin on an opposite side from where the projectile is located and an end portion of the second fixing pin on an opposite side from where the projectile is located are integrally formed with an inner wall surface of the cylindrical space of the housing; and the cut portion is orientated orthogonal to the housing and disposed facing the insulation space.

4. A method of manufacturing the cut composite according to claim 1 comprising the projectile, the cut portion, the first connection portion, and the second connection portion formed integrally together, the method comprising:

1) disposing a cut portion in a mold, the cut portion comprising a flat surface portion with a quadrangular shape, and a first cut portion side surface portion and a second cut portion side surface portion which are side surface portions extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion;

2) integrally forming injection molding a resin to form a projectile and integrally molding together the projectile and the cut portion, with a flat surface portion of the cut portion being in contact with an end surface of the projectile, a first through hole of a first cut portion side surface portion of the cut portion being placed on a first fixing pin formed on a first side surface portion of the projectile, and a second through hole of a second cut portion side surface portion of the cut portion being placed on a second fixing pin formed on a second side surface portion of the projectile; and 3) integrally forming the projectile, the cut portion, the first connection portion, and the second connection portion and obtaining a cut composite by placing a first attachment hole of the first connection portion on the first fixing pin and placing a second attachment hole of the second connection portion on the second fixing pin, then deforming the first fixing pin and the second fixing pin.

5. A method of manufacturing the second composite according to claim 2 comprising the projectile, the cut portion, the first connection portion, the second connection portion, and the bottom clip formed integrally together, the method comprising:

1) disposing a cut portion, a first connection portion, and a second connection portion in a mold, the cut portion comprising a flat surface portion with a quadrangular shape, and a first cut portion side surface portion and a second cut portion side surface portion which are side surface portions extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion, the first connection portion comprising a first flat portion with a rectangular shape in a plan view and a first connection terminal extending down from one of opposing short side edges of the first flat portion, the first connection terminal comprising a first attachment hole formed through the first connection terminal in a thickness direction, and the second connection portion comprising a second flat portion with a rectangular shape in a plan view and a second connection terminal extending down from one of opposing short side edges of the second flat portion, the second connection terminal comprising a second attachment hole formed through the second connection terminal in a thickness direction, in a manner such that the first through hole of the cut portion and the first attachment hole of the first connection portion are aligned concentric with one another and the second through hole of the cut portion and the second attachment hole of the second connection terminal are aligned concentric with one another; and 2) obtaining a second composite via injection molding of a resin.

6. A method of manufacturing the third composite according to claim 3 comprising the projectile, the cut portion, the first connection portion, the second connection portion, and the inner wall surface of the cylindrical space of the housing formed integrally together, the method comprising:

1) disposing a housing comprising an open ended cylindrical space in a mold;

2) disposing a first connection portion, a cut portion, and a second connection portion in the mold at an opening portion of a cylindrical space of the housing on a second end portion side, the cut portion comprising a flat surface portion with a quadrangular shape comprising a through hole that forms a resin-injection hole, and a first cut portion side surface portion and a second cut portion side surface portion which are side surface portions extending down in an identical direction from opposing edges of the flat surface portion with the quadrangular shape, the first cut portion side surface portion comprising a first through hole formed in a thickness direction of the first cut portion side surface portion and the second cut portion side surface portion comprising a second through hole formed in a thickness direction of the second cut portion side surface portion, the first connection portion comprising a first flat portion with a rectangular shape in a plan view and a first connection terminal extending down from one of opposing short side edges of the first flat portion, the first connection terminal comprising a first attachment hole formed through the first connection terminal in a thickness direction, and the second connection portion comprising a second flat portion with a rectangular shape in a plan view and a second connection terminal extending down from one of opposing short side edges of the second flat portion, the second connection terminal comprising a second attachment hole formed through the second connection terminal in a thickness direction, in a manner such that the first through hole of the cut portion and the first attachment hole of the first connection portion are aligned concentric with one another and the second through hole of the cut portion and the second attachment hole of the second connection terminal are aligned concentric with one another; and 3) forming a cut composite at the opening portion of the cylindrical space on the second end portion side via injection molding of a resin injected from the through hole that forms a resin-injection hole of the cut portion.

* * * * *

UNITED STATES PATENT AND TRADEMARK OFFICE
CERTIFICATE OF CORRECTION

PATENT NO. : 10,910,181 B2  
APPLICATION NO. : 16/638874  
DATED : February 2, 2021  
INVENTOR(S) : Toshiyuki Sakai It is certified that error appears in the above-identified patent and that said Letters Patent is hereby corrected as shown below:

In the Specification

Column 15, Line 30:  
Change: "A second composite 10B illustrated in FIG. 5A"  
To: --A third composite 10B illustrated in FIG. 5A--

Column 15, Line 36:  
Change: "The second composite 10B"  
To: --The third composite 10B--

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*